United States Patent [19]

Bazin et al.

[11] Patent Number: 5,087,475
[45] Date of Patent: Feb. 11, 1992

[54] PROCESS FOR THE FILM-COATING OF SEED MATERIALS

[75] Inventors: Michelle Bazin, Outarville; Antoine Depeyre, La Bastide St. Pierre; Joel Kamoda, Mereville, all of France

[73] Assignee: Etablissements CERES, Mereville, France

[21] Appl. No.: 681,428

[22] Filed: Apr. 5, 1991

Related U.S. Application Data

[63] Continuation of Ser. No. 532,345, Jun. 4, 1990, abandoned, which is a continuation of Ser. No. 92,185, Sep. 2, 1987, abandoned.

[30] Foreign Application Priority Data

Sep. 2, 1986 [FR] France .................. 86 12450

[51] Int. Cl.$^5$ ............................... A01N 3/00
[52] U.S. Cl. ............................ 427/4; 47/57.6; 118/303
[58] Field of Search ............ 118/303; 427/4; 47/57.6

[56] References Cited

U.S. PATENT DOCUMENTS

| | | | |
|---|---|---|---|
| 2,944,512 | 7/1960 | Wilson | 118/303 |
| 3,422,792 | 1/1969 | Glatt | 118/303 |
| 3,573,966 | 4/1971 | Hostetler | 427/3 |
| 3,934,545 | 1/1976 | Schady | 118/303 X |
| 4,326,480 | 4/1982 | Rollette | 118/303 |
| 4,465,017 | 8/1984 | Simmons | 118/418 |
| 4,639,383 | 1/1987 | Casey | 118/303 |
| 4,644,665 | 2/1987 | Naunapper et al. | 118/303 X |
| 4,658,754 | 4/1987 | Messner et al. | 118/303 |

FOREIGN PATENT DOCUMENTS 2551579 5/1977 Fed. Rep. of Germany .

Primary Examiner—Shrive Beck
Assistant Examiner—Terry J. Owens
Attorney, Agent, or Firm—Burns, Doane, Swecker & Mathis

[57] ABSTRACT

A batch of seed materials is film-coated with a gas- and water-permeable, thin, adherent, uniform non-phytotoxic continuous surface film of a polymeric film-former, by (a) establishing and continuously maintaining a unit compact volume of moisture-containing viable seed materials in a state of continuous agitation and (b) continuously spraying and coating this unit compact volume of seed materials with an adjusted essentially steady predetermined flow rate of a liquid solution or suspension of a polymeric film-former, while simultaneously (i) continuously positively drying the coated seed materials by continuously directing a predetermined flow rate of a gaseous feedstream thereagainst that is at a controlled temperature less than that would adversely affect the viability thereof, (ii) continuously monitoring the temperature within the unit compact volume of seed materials in a state of continuous agitation and (iii) continuously maintaining a moisture content in the final product coated seed materials essentially at the same level as that in the uncoated seed materials, and whereby (c) the final product film-coated seed materials have essentially the same shapes as the corresponding uncoated seed materials.

11 Claims, 1 Drawing Sheet

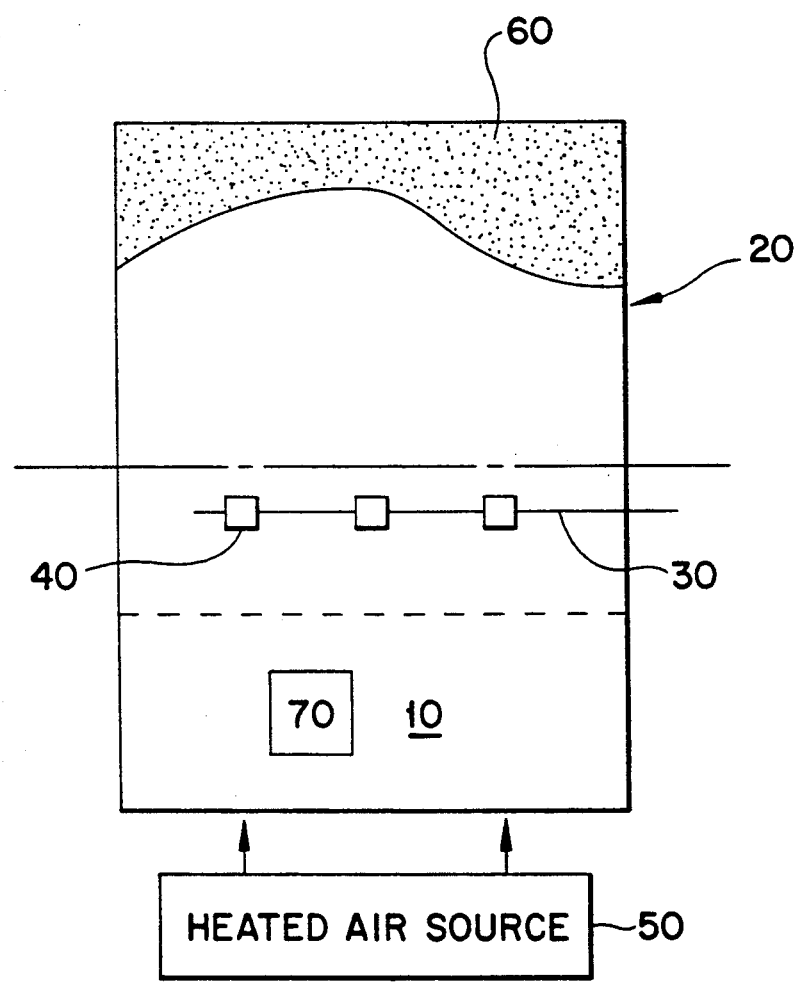

PROCESS FOR THE FILM-COATING OF SEED MATERIALS

This application is a continuation of application Ser. No. 07/532,345, filed June 4, 1990, now abandoned, which is a continuation of application Ser. No. 092,185, filed Sept. 2, 1987, now abandoned.

The present invention relates to a process for the film-coating of seed materials and to devices for the implementation of this process.

The term "seed material" refers to any plant organ capable of leading to the regeneration of a plant and obtained, either by the sexual process, in which case it will refer to the seed, or by vegetative multiplication, in which case it will refer to the seedling or the explant.

Within the meaning of the present description, the term "film-coating" refers to the deposition of a very fine film, of regular thickness, of a film-forming substance which is permeable to water and to air and non-phytotoxic on the surface of a seed material. This film which does not substantially modify the shape of the seed material may contain additives such as especially additives for presentation, fillers, adhesives, dyes or plant growth promoting substances, especially chemicals for protection against diseases and pests. Therefore, in addition to an improvement in its appearance and in its presentation increasing its suitability for sowing, film-coating makes it possible to confer on the seed material a decrease of dusts, a more regular and longer lasting (for example twice as long) protection against diseases and pests using a minimum of protective active substance, because of the good adherence of the film on the seed material.

This recent technique is very promising because of the advantages it offers, but has stringent requirements with regard to the quality of the processes and equipment. Techniques for grading the seed materials in a fluidized bed, in which the seed materials maintained in suspension in a stream of air are treated by spraying with a suspension or liquid solution (aqueous and/or in an organic medium) of the film-forming substance are mainly proposed at the moment. The equipment used is in general vertical.

Although these techniques prove to be of interest for treating small quantities, they can only be extrapolated with difficulty on a real industrial scale, that is, for treating several tons per hour. In fact, the adjustment of the different parameters for maintaining a good quality of film-coating is difficult, especially due to the impact of the seeds between one another in the stream of the suspension fluid, which forms unacceptable irregularities, even cracks in the film.

Therefore, there is a need for processes and equipment which enable a very good quality film-coating to be carried out and which can be used satisfactorily on an industrial scale.

The object of the present invention is to meet this need by providing a process and suitable equipment for the treatment.

It relates more particularly to a process for the film-coating of seed materials using a water- and gas-permeable, adhesive film-forming substance, which consists in spraying the film-forming substance on seed materials and drying the seed materials coated with the deposited film, characterized in that the spraying and the drying are carried out simultaneously using a compact volume of seed materials in motion.

Within the meaning of the invention, the term "seed material" refers essentially to the bare seed material before any treatment. However, the film-coating as defined above can also be applied to seed materials which are already covered either by coating, or by a previous film-coating.

The seed materials which can be used according to the process of the invention are of very different sizes. In the case of seeds, they are generally between 0.1 and 25 millimeters.

The process according to the invention simultaneously comprises a spraying using a fluid suspension of the film-forming substance and a drying during spraying, using a compact volume of seed materials in continuous motion. The expression "compact volume" means that unlike in the prior art, the seed materials are not distinct and separated from one another in a stream of the suspension fluid, but are in continous contact with one another. The spraying is carried out using at least one nozzle, preferably from above the volume of seed materials to be treated, so that the spray jet is directed from the top downwards. The flow rate of the fluid suspension of the film-forming substance through the nozzle depends on the quantity of the substance to be applied on the seed materials and consequently on the size of the latter, the volume of seed material treated and the viscosity of the film-forming substance. The nozzle pressure is adjusted to obtain a fine and steady spray.

The film-forming substance which can be used according to the process of the invention is generally a polymeric substance which leads to a film with good adherence and without phytotoxic effect on the seed material, permeable to water and to gases, essentially to air. The polymeric substance may be of varied nature, natural or synthetic, e.g. a water-soluble polymer such as a polyalkylene glycol, in particular a polyethylene glycol, a polyvinyl alcohol, a polyacrylic derivative, a cellulose derivative, in particular, a cellulose ester or ether or a hydroxycellulose, a polysaccharide or a water-soluble polyester, or a water-insoluble polymer, in the form of a latex, such as a polystyrene, a butadiene polystyrene or a polyvinyl or polyacrylic derivative. Mixtures of these polymers or of copolymers may, of course, be used if required.

Furthermore, the film-forming substance may contain additives, such as additives for presentation, fillers, dyes, plant growth promoting substances such as agrochemical active substances, e.g. fungicides, insecticides, phytotoxicity inhibitors, herbicides, growth regulators, bird repellents, inoculums of microorganisms and the like.

The film-forming substance is sprayed in the form of a solution or a suspension, which is most frequently aqueous but may also be prepared with an organic solvent, e.g. a lower alcohol or a ketone or a halogenated hydrocarbon. The solvent must not, of course, be phytotoxic. The film-forming substance content of the suspension depends on the quantity of the substance to be applied on the seed material, a quantity which in itself varies according to the nature and the size of the seed materials and which is in general approximately 0.05 to 20% by weight of the latter. The film-forming substance concentration in the suspension is generally between 1 and 20% by weight.

The drying according to the invention may be carried out by any suitable means. The passage of a stream of dry gas which does not substantially have a deleterious effect on the seed material, preferably air, through and/or over the surface of the continuously stirred compact volume of seed materials is generally used. A gas is generally used at a temperature greater than the ambient temperature but much lower than the temperature at which the seed materials lose their capacity and their speed of germination. This threshold depends on the nature of the seed but generally does not exceed 50° C.

The dry gas supply may be located in different ways, it being possible for the gas stream to pass through the volume of seed materials in motion and/or to pass over the surface of the latter. The pressure and the flow rate of this gas stream are adjusted according to the volume of seed materials to be dried, their nature, their moisture content before the film-coating and that aimed at, and the moisture introduced by the spray liquid.

In the course of the operation, the temperature of the compact volume of seed materials in motion is, of course, constantly monitored and the moisture content of the seed materials is monitored and maintained at its initial level.

The condition of simultaneity of spraying and drying is essential for the quality of film-coating. In fact, it enables a fine, adherent and uniform film to be obtained on the surface of the seed material, the uniformity being partially due to the gentle rubbing of the seed materials against one another in the compact volume in continuous motion.

For the implementation of the precess according to the invention, it is possible to resort to a device, also forming the subject of the invention, of the rotary drum type, especially of the horizontal, preferably cylindrical type, within which the means for spraying and the means for drying consisting of dry gas supplies through and/or on the compact volume of seed materials in motion are arranged. The volume of the rotary drum must be very much greater than that of the compact volume of seed materials to be treated. The part of the device comprising the rotary drum and the means for spraying may be a device commonly used for coating seed materials. During operation, the compact volume of seed materials in motion occupies the lower part of the volume of the drum and receives the spray liquid from above. The gas supply may be located in different ways.

According to a first variation, the gas inlet(s) is(are) located substantially along the axis of the drum, which allows the ventilation of the mass of seed materials along the entire length of the drum.

According to a second variation, gas supply is carried out through the wall-jacket of the drum which may thus be partially or completely perforated. In this case, because of the contact of this wall with the seed materials, the diameter of the holes must be substantially less than the mean particle diameter of these seed materials. The evacuation of the gas leaving after having absorbed moisture may be located either on a side of the drum, or on a part of the wall-jacket other than that of the dry gas inlet.

One procedure for the process of the invention in the devices above first comprises loading the seed materials into the drum, which has previously been put into the rotary motion at a speed sufficient to ensure the travel of the seed materials from the base to the upper surface of the volume of seed materials, and in which the dry gas (air) inlet is open and the spray nozzle has previously been supplied with, for example, an aqueous suspension of the film-forming substance and started off.

The period of each operation depends on the size of the load, the type of seed materials and their original moisture content and that desired to be obtained. Periods of a few minutes to a few hours are generally well suited.

The accompanying FIGURE of Drawing depicts, by way of illustration only, a preferred embodiment of the film-coating apparatus according to the invention. The drawing is a schematic side view of the apparatus, with the drum 20 shown partly in vertical section and partly broken-away.

The following examples illustrate one embodiment of the process according to the invention. Examples 1 and 2 are presented with reference to the accompanying FIGURE of Drawing.

EXAMPLE 1

A 15 kg load 10 of cleaned and sifted sunflower seeds is introduced into a horizontal cylindrical drum 20, 800 mm in diameter and 600 mm long, revolving at 10 rpm, perforated 60 over the entire wall-jacket, equipped, internally, along an axis parallel to the axis of rotation of the drum and below it, with a rack 30 of 3 nozzles 40. The average distance between the nozzles 40 and the upper surface of the seed volume 10 is 10 cm. The nozzles 40 are supplied, under a pressure of 4 bars and an output of 60 ml/mn, with an aqueous 1% by weight suspension of polyvinyl alcohol as the film-forming substance, and distribute and distribute the suspension at a rate of 150 ml/kg of seeds; the suspension also contains a quantity of benomyl (methyl 1-(butylcarbamoyl)-benzimidazol-2-yl carbamate) fungicide so as to apply 1 g per kg of seeds, a quantity of mercaptodimethur (3,5-dimethyl-4-(methylthio)phenyl N-methylcarbamate) insecticide so as to apply 5 g/kg of seeds, as well as 100 g of clay, and 20 g of violet dye, per liter of suspension.

Warm dry air is directed to the upper surface of the seed volume, through a longitudinal rack 50, at a distance from that carrying the nozzles 40, and from below the perforated wall-jacket, so that the temperature within this volume 10 is approximately 30° C.

The operation is carried out for 40 mn. The moisture content of the drum atmosphere and the temperature within the volume of seeds 10 are monitored throughout the entire operation. Temperature monitoring means 70 are thus provided to accomplish this result.

A load of very uniformly coated and dyed seeds is obtained.

EXAMPLE 2

The operation is carried out with the same device and at the same settings, except that:

a load of beet seeds, which have previously been coated, is treated;

the average output of the nozzles 40 is 130 ml/mn;

the operation lasts for approximately 40 mn, with two 20 mn stages;

during the first, the suspension contains 10 g/l of hydroxypropylmethyl cellulose (Blanose) and 40 g/l of hymexazol (5-methylisoxazol-3-ol) so as to apply 5.6 g/100,000 seeds; and during the second, the suspension contains 35 g/l of carboxymethyl cellulose (Blanose), 15 ml/l of the insecticide CURATERR (2,3-dihydro-2,2-dimethylbenzofuran-7-yl N-methylcarbamate) (at a concentration of 336 g/l) at a rate of 3 g/100,000 seeds, as well as 100 g/l of clay and 10 ml/l of a red dye.

Coated and film-coated beet seeds of a very uniform colour are obtained.

EXAMPLE 3

Results similar to those of Examples 1 and 2 are obtained by operating in a drum of similar characteristics, the only difference being that the wall-jacket is not perforated and the warm dry air enters only through a rack above the volume of seeds in motion.

We claim:

1. A process for the film-coating of a batch of seed materials with a gas- and water-permeable, thin, adherent, uniform non-phytotoxic continuous surface film of a polymeric film-former, comprising (a) establishing and continuously maintaining a unit compact volume of moisture-containing viable seed materials in a state of continuous agitation, and (b) continuously spraying and coating said unit compact volume of seed materials with an adjusted essentially steady predetermined flow rate of a liquid solution or suspension of a polymeric film-former, while simultaneously (i) continuously positively drying the coated seed materials by continuously directing a predetermined flow rate of a gaseous feedstream thereagainst that is at a controlled temperature less than that as would adversely affect the viability thereof, (ii) continuously monitoring the temperature within said unit compact volume of seed materials in a state of continuous agitation and (iii) continuously maintaining a moisture content in the final product coated seed materials essentially at the same level as that in the uncoated seed materials, and whereby (c) the final product film-coated seed materials have essentially the same shapes as the corresponding uncoated seed materials.

2. The process as defined by claim 1, said polymeric film-former comprising a water-soluble polymer.

3. The process as defined by claim 1, said polymeric film-former comprising a water-insoluble polymer.

4. The process as defined by claim 1, said liquid solution or suspension of a polymeric film-former further comprising a filler, adhesive, dye, fungicide, insecticide, phytotoxicity inhibitor, herbicide, growth regulator, bird repellent, microorganism inoculum, or combination thereof.

5. The process as defined by claim 1, said liquid solution or suspension of a polymeric film-former comprising an aqueous solution thereof.

6. The process as defined by claim 1, said liquid solution or suspension of a polymeric film-former comprising an organic solvent solution thereof.

7. The process as defined by claim 1, wherein said gaseous feedstream is a stream of hot air.

8. The process as defined by claim 1, wherein said gaseous feedstream is a stream of dry, hot gas continuously directed onto the surface of said unit compact volume of seed materials in a state of continuous agitation.

9. The process as defined by claim 1, wherein said gaseous feedstream is a stream of dry, hot gas continuously directed through said unit compact volume of seed materials in a state of continuous agitation.

10. The process as defined by claim 1, said liquid solution or suspension of a polymeric film-former comprising a latex of a water-insoluble polymer.

11. The process as defined by claim 1, wherein the predetermined flow rate of a gaseous feedstream is constant.

* * * * *